UNITED STATES PATENT OFFICE.

HUGH M. COCHRAN, OF McCONNELSVILLE, OHIO.

IMPROVEMENT IN THE MANUFACTURE OF CHEWING-TOBACCO.

Specification forming part of Letters Patent No. 38,995, dated April 7, 1863.

*To all whom it may concern:*

Be it known that I, HUGH M. COCHRAN, of McConnelsville, in the county of Morgan and State of Ohio, have invented certain new and useful Improvements in the Manufacture of Chewing-Tobacco; and I hereby declare that the following is a full, clear, and exact description of the same.

In the manufacture of chewing-tobacco the tobacco as received from or delivered by the first producer undergoes a series of operations, the object of which is to produce as a merchantable article cured or sweated and suitably-flavored tobacco, condensed into tablets, twists, or other convenient form. This was heretofore accomplished by first sprinkling over the tobacco water with or without a sweetening composed of sugar, licorice-juice, or other liquid or liquefiable substance, to which may be added a flavoring—such as whisky, rum, or other like substance—according to the taste or judgment of the manufacturer. The tobacco, having been manipulated sufficiently to remove its bitterness and rendered supple for subsequent operations, is now brought upon a platform or bench, where it is formed into plugs, twists, or is otherwise compacted, and is cut into proper lengths. This done, it is placed into molds, submitted to powerful compression, and allowed to remain therein from half an hour to five or six hours, according to the quality of tobacco. It is then removed from the mold, packed into boxes, and placed in the drying-room, where it is allowed to cure or sweat. This method is objectionable for many reasons. The tobacco, when cured in boxes, is liable to become moldy and to lose much of the peculiar appearance and taste which are so highly valued by the consumer.

The object of my invention is to so prepare chewing-tobacco as to prevent it from getting moldy, and to permanently impart to it a rich taste and flavor and glossy appearance; and my invention consists, first, in curing or sweating tobacco previous to its being put "in case" by exposing the same to a free circulation of heated air; second, in combining with the curing of tobacco previous to being put in case the preparing of the molds with a flavoring-liquid, whereby the appearance and taste of the product are greatly improved, while its easy delivery from the mold is thereby secured; third, in combining with the curing and sweating of tobacco previous to being put in case and the pressing of the same in molds coated with a flavoring-liquid the submitting of the tobacco to a second press previous to its being packed ready for market.

To enable others to make and use my invention, I shall now describe the *modus operandi*.

The tobacco as received by the manufacturer in bunches or hands is tightly packed in a hogshead, and so dry that it would crumble into dust if not handled with proper care. The first operation therefore has for its object the restoration of the pliability of the leaf, so as to allow of its being manipulated. This is done by dipping the leaves in water or by sprinkling over and through the mass of tobacco water or some other moistening substance—for instance, sugar or salt. A sweetening may be added, which is generally composed of sugar, molasses, licorice-juice, &c. Most manufacturers have their own way of sweetening, and impart to the tobacco more or less sweetness, according to the taste of the customers to be supplied. The tobacco-leaves, having been duly manipulated, are taken to the bench, where they are rolled or twisted into shape approximating the form of the molds and wrapped into a leaf to give it a finished appearance. The tobacco thus formeed into what is denominated "plugs" or "twists" is conveyed to the molds. These molds, before receiving the plugs or twists, are coated by a flavoring composition consisting of brandy, rum, or other spirituous liquor in which the essence of suitable spices are dissolved. Sometimes it may be necessary to add a small quantity of olive-oil. This is used to prevent particles of tobacco from adhering to the molds. The plugs or twists are placed into the molds and allowed to remain therein under pressure for from thirty minutes to six hours. When the plugs are sufficiently condensed they are removed from the molds and carried into the drying-room, where they are disposed onto shelves or supports and exposed to a free circulation of air heated to from 100° to 110° Fahrenheit. The curing or sweating process now commences, and is kept up from thirty-six to forty-eight hours. During this part of the operation the tobacco is slightly fermented, and so much of its moisture is expelled as to completely dry the surface of the plug.

The tobacco plugs or twists thus cured or sweated are then put in case—i. e., they are tightly packed, preferably edgewise, in a case, which is closed by a cover or by another case placed on top of it. The tobacco is thus allowed to remain for from five to eight days, during which time the moisture still confined in the tobacco will be absorbed by the whole mass uniformly. When the tobacco is duly pervaded by the requisite amount of moisture it is removed from the case and replaced into the molds previously lined or coated with the flavoring-matter, with or without oil, as before referred to. In these molds the plugs or twists are submitted to pressure until they acquire a "set"—i. e., until permanently condensed into shape. This done, the plug may be packed at once into the boxes, or they may previously be pressed to give it a smooth surface or finish. For this purpose they may be placed under a press with sheets of tin or iron and tin interposed. After this the article is ready to be delivered to the market in packages or boxes of usual dimensions.

Having thus described my invention and the manner in which the same is or may be carried into effect, I shall state my claims as follows:

1. Curing or sweating tobacco previous to its being put in case by exposing the same to a free circulation of heated air, substantially as set forth.

2. Combining with the curing of tobacco previous to being put in case the preparing of the molds with a flavoring-liquid, whereby the appearance and taste of the product is greatly improved, while its easy delivery from the mold is thereby secured, substantially as set forth.

3. Combining with the curing and sweating of tobacco previous to being put in case and the pressing of the same in molds coated with a flavoring-liquid the submitting of the tobacco to a second press previous to its being packed ready for market, substantially as set forth.

In testimony whereof I have signed my name to this specification before two subscribing witnesses.

H. M. COCHRAN.

Witnesses:
A. POLLOK,
WM. H. HARRISON.